(12) United States Patent
Gagnon et al.

(10) Patent No.: US 6,167,774 B1
(45) Date of Patent: Jan. 2, 2001

(54) HANDLEBAR-MOUNTABLE ERGONOMIC SHIFTER FOR A MOTOR VEHICLE

(75) Inventors: Claude Gagnon, Magog; Pascal Larose, Sherbrooke; John Gale, Deauville, all of (CA)

(73) Assignee: Bombardier, Inc., Quebec (CA)

( * ) Notice: Under 35 U.S.C. 154(b), the term of this patent shall be extended for 0 days.

(21) Appl. No.: 09/246,286

(22) Filed: Feb. 8, 1999

(51) Int. Cl.⁷ ................................................. B60K 17/04
(52) U.S. Cl. ..................... 74/473.12; 74/335; 74/483 PB
(58) Field of Search .................. 74/473.12, 483 PB, 74/473.1, 551.9, 557, 551.1, 551.8, 335

(56) References Cited

U.S. PATENT DOCUMENTS

| | | | |
|---|---|---|---|
| 3,894,442 | * | 7/1975 | Hembree .............................. 74/473 R |
| 4,641,723 | | 2/1987 | Takanashi et al. .................... 180/315 |
| 5,134,008 | * | 7/1992 | Alm ......................................... 428/90 |
| 5,708,244 | * | 1/1998 | Conti .................................. 200/64.85 |
| 5,865,705 | * | 2/1999 | Shamoto et al. ......................... 477/79 |
| 5,957,001 | * | 9/1999 | Gualtieri et al. .................. 74/473.12 |
| 6,012,351 | * | 1/2000 | Ysker ................................. 74/473.15 |
| 6,035,725 | * | 3/2000 | Graf et al. ............................... 74/335 |

* cited by examiner

*Primary Examiner*—David Fenstermacher
(74) *Attorney, Agent, or Firm*—Pillsbury Madison & Sutro LLP

(57) ABSTRACT

An ergonomic shifter mountable to a handlebar of a motor vehicle, the shifter comprising a housing mountable to the handlebar and a unitary shifter toggle switch movably connected to the housing, the unitary shifter toggle switch being movable from a neutral position to an upshift position and a downshift position. Preferably, the unitary shifter toggle switch is pivotally connected to the housing. Preferably, the shifter is mounted to the handlebar adjacent a gripping portion of the handlebar so that the driver can easily upshift or downshift the vehicle. Preferably, the unitary shifter toggle switch has a plurality of small protrusions for enhancing a driver's grip.

12 Claims, 2 Drawing Sheets

HANDLEBAR-MOUNTABLE ERGONOMIC SHIFTER FOR A MOTOR VEHICLE

FIELD OF THE INVENTION

The present invention relates to an ergonomic shifter mountable to the handlebar of a motor vehicle, and more particularly to an ergonomic shifter mountable to the handlebar of an all-terrain vehicle or motorcycle.

BACKGROUND OF THE INVENTION

Off-road vehicles such as the all-terrain vehicle (ATV) and the motorcycle are often driven across rough terrain. In both recreational and racing applications, these vehicles are repeatedly upshifted and downshifted as they encounter curves, hills and bumps. The transmissions of these vehicles must therefore be reliable and easy to operate.

For vehicles equipped with handlebars or handlebar-like steering mechanisms, it is especially arduous for the driver of the vehicle to maintain a firm grip on the shifter when traversing rough terrain. In other words, when the driver is traversing rough terrain, he or she has the tendency to temporarily lose his or her grip on the gear shifter. This means that gears cannot be easily shifted when the driver is being jostled by rough terrain. Recently, certain efforts have been made to solve this problem. Notably, Takanashi et al. in U.S. Pat. No. 4,641,723 discloses a handle switch assembly for a motor vehicle comprising at least two push button switch elements housed in the switch housing. In order that the driver may keep his eyes entirely on where he's going (which is very important when riding over rough terrain), the push buttons can be differentiated by their relative position on the housing and by the tactually distinctive projections protruding from each push button.

However, when operating a vehicle employing the Takanashi et al. switch assembly, the driver must grope with his or her thumb for the various push buttons in order to shift gears. In normal operation, the driver's thumb typically rests between the upshift and downshift buttons. When the driver wishes to upshift or downshift, he or she must slide his or her thumb either upwards to the upshift button or downwards to the downshift button. It should be apparent that operating a two-button shifter while traversing rough terrain at relatively high speeds is not easy because while the driver's hand is tightly gripping the handlebar, the thumb must be relaxed enough to be suitably dextrous to tactually sense and actuate the push buttons.

Thus, there is a need in the motor vehicle industry for an improved, ergonomic handlebar shifter.

OBJECTS AND STATEMENT OF THE INVENTION

It is thus an object of the present invention to provide a handlebar shifter that is ergonomic and easy to operate.

It is another object of the present invention to provide a handlebar shifter that allows the driver to easily shift gears when traversing rough terrain.

It is another object of the present invention to provide a handlebar shifter that allows the driver to easily shift gears without having to grope for the switches.

As embodied and broadly described herein, the invention provides an ergonomic shifter mountable to a handlebar of a motor vehicle, the shifter comprising a housing mountable to said handlebar and a unitary shifter toggle switch movably connected to said housing, said unitary shifter toggle switch being movable from a neutral position to an upshift position and a downshift position, said unitary shifter toggle switch being connected to an upshift switch element and a downshift switch element, said elements being connected by electrical wires to an electronic transmission control module.

This ergonomic shifter is easy to operate when the driver is traversing rough terrain. With this arrangement, it is easier to shift gears than with prior art shifters because the driver can firmly grip the handlebar and does not have to grope for the upshift and downshift switches. This means that the driver of such a vehicle can concentrate more on his environment and can more easily shift when encountering bumps, hills or the like. In other words, an ergonomic shifter not only makes driving easier and more pleasant but it also enhances the performance potential of the vehicle.

Preferably, the unitary shifter toggle switch is pivotally mounted to the housing. This arrangement allows the driver's thumb to press against the unitary shifter toggle switch in the neutral position. When the driver wishes to upshift or downshift, he or she simply pivots his or her thumb upwards or downwards. This maximizes the ease and comfort of shifting.

Preferably, the unitary shifter toggle switch has a plurality of small protrusions for enhancing a driver's grip. This is particularly useful when operating the vehicle in the rain or snow or when the driver's is wearing gloves that would otherwise slip on the unitary shifter toggle switch.

As embodied and broadly described herein, the invention provides a motor vehicle having a handlebar and an ergonomic shifter, the shifter comprising a housing mountable to the handlebar and a unitary shifter toggle switch movably connected to the housing, the unitary shifter toggle switch being movable from a neutral position to an upshift position and a downshift position, said unitary shifter toggle switch being connected to an upshift switch element and a downshift switch element, said elements being connected by electrical wires to an electronic transmission control module.

With such a vehicle, the driver can readily upshift and downshift without having to grope for the two distinct shift buttons. This arrangement not only makes it easier and more comfortable for the driver to change gears but it also enhances the performance potential of the vehicle since the driver can shift at will even when running over bumpy terrain. Unlike the prior art shifters with which the driver might have a difficult time perceiving the location of the two shifter buttons without looking or groping, the present invention ensures that the driver maintains control of the shifter even when traversing rough terrain.

Other objects and features of the invention will become apparent by reference to the following description and the drawings.

BRIEF DESCRIPTION OF THE DRAWINGS

A detailed description of the preferred embodiments of the present invention is provided hereinbelow, by way of example only, with reference to the accompanying drawings, in which.

Figure 2:
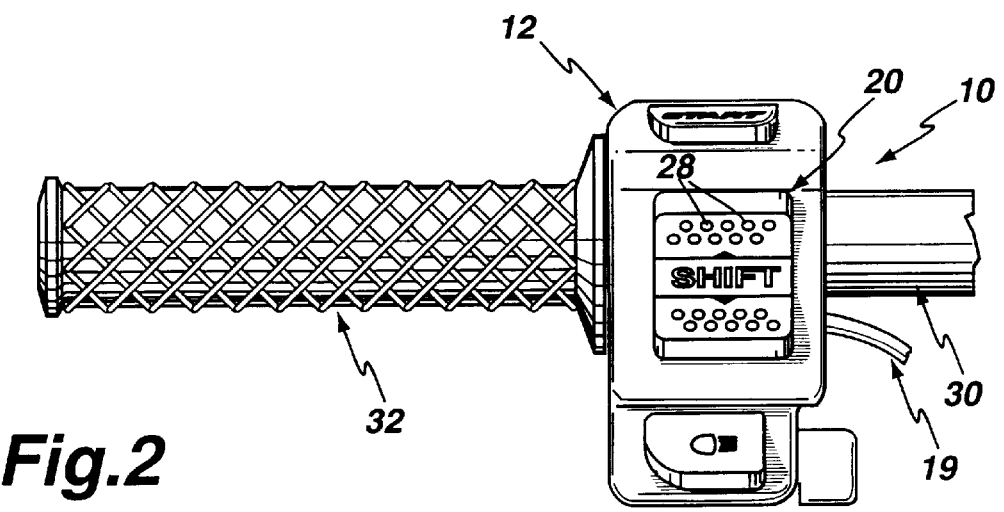
FIG. 2 is a front elevational view of the ergonomic shifter of FIG. 1.

In the drawings, preferred embodiments of the invention are illustrated by way of examples. It is to be expressly understood that the description and drawings are only for the purpose of illustration and are an aid for understanding. They are not intended to be a definition of the limits of the invention.

DETAILED DESCRIPTION OF A PREFERRED EMBODIMENT

FIGS. 1 to 5 show a handlebar-mountable ergonomic shifter for a motor vehicle according to the present invention. This ergonomic shifter is designed to be mounted to the handlebar of an off-road vehicle like an ATV (all-terrain vehicle) or motorcycle. The ergonomic shifter could also be adapted to be mounted to any vehicle that has a handlebar-like steering mechanism. The ergonomic shifter is designed to survive the arduous environment in which an off-road vehicle is typically placed. For example, the shifter is designed to operate at extremely low and high temperatures and is designed to be rugged enough to resist the sort of impacts and vibrations that one might expect from high-speed travel over extremely rough terrain.

Figure 1:
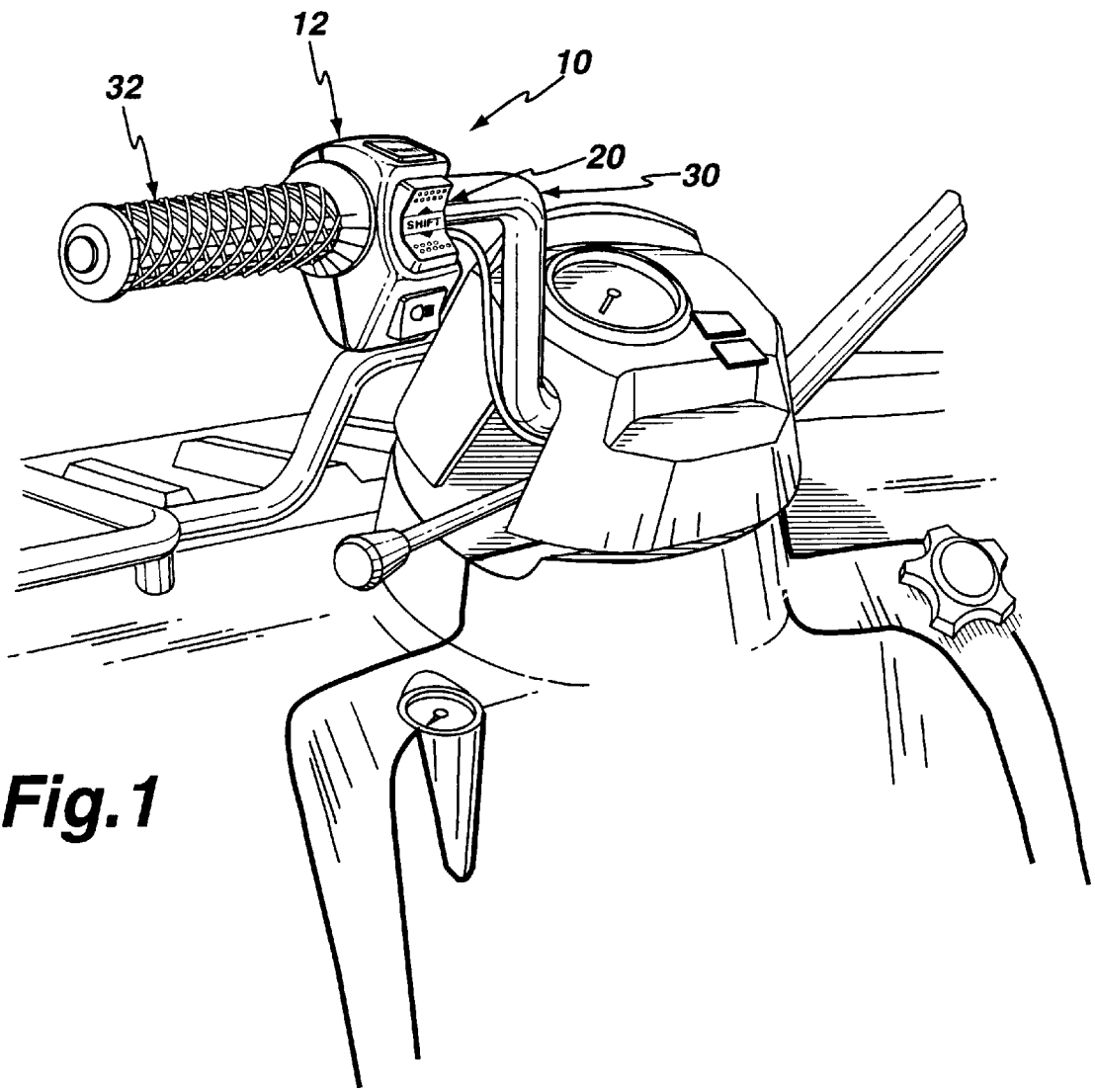
FIG. 1 is an isometric view illustrating an ergonomic shifter mounted to a handlebar of a motor vehicle in accordance with the present invention.
Figure 3:
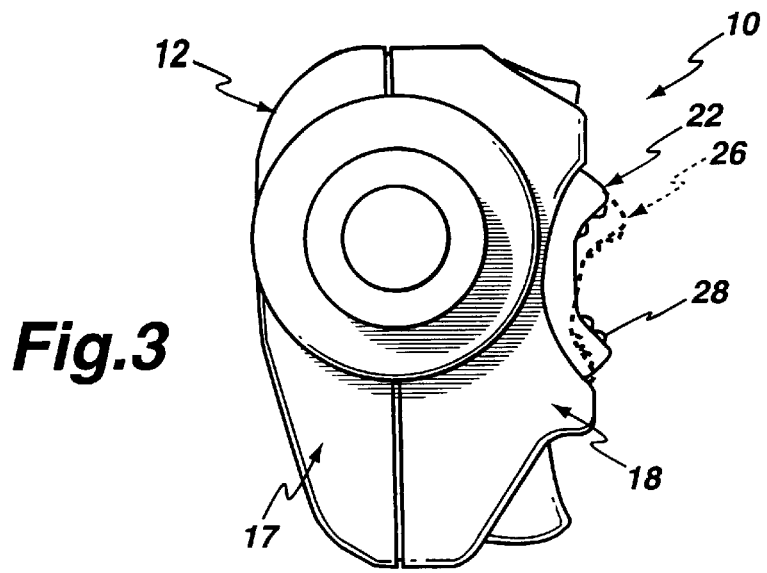
FIG. 3 is a left side elevational view of the ergonomic shifter of FIG. 1.

In the most preferred embodiment, FIG. 1 illustrates an ergonomic shifter designated comprehensively by the numeral 10. The shifter 10 is mountable to a handlebar 30. As stated above, it should be understood that the handlebar 30 can also be a handlebar-like steering mechanism (e.g. a steering wheel) that a driver grips and to which a shifter is mountable. As depicted in FIG. 1, the handlebar 30 has a gripping portion 32 which may be coated with a rubber or a soft polymer to increase grip and comfort.

The shifter 10 is preferably mounted to the handlebar 30 adjacent the gripping portion 32 so that the driver, while gripping the gripping portion 32, can reach the shifter 10 with his or her thumb. It should be understood that while FIG. 1 shows the shifter 10 mounted to the right of the gripping portion 32, the shifter 10 could also be mounted to the left of the gripping portion 32 for operation by the right hand (i.e. the shifter 10 would be mounted to the right branch of the handlebar 30 as opposed to the left branch of the handlebar as illustrated in FIG. 1).

As shown in FIGS. 1–4, the ergonomic shifter 10 comprises a housing 12 mountable to the handlebar 30. The housing 12 is preferably molded from a tough plastic that resists fading, discoloration, scratching, shrinking and general degradation of mechanical properties when exposed to sunlight, specified cleaning solvents, common lubricants and fuels. Furthermore, the housing 12 is to be sealed so as to resist the potentially deleterious effects of sand, dust, mud, rain and snow.

Figure 5:
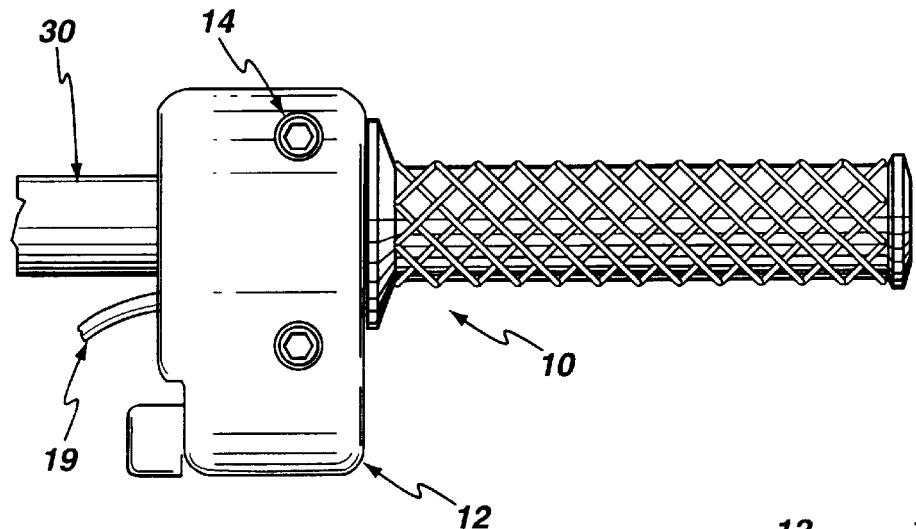
FIG. 5 is a rear elevational view of the ergonomic shifter of FIG. 1 mounted to a typical handlebar.

The housing 12 is preferably constructed of two molded components 17, 18 which are held together by fasteners 14. In attaching the shifter 10 to the handlebar 30, the two matching components 17, 18 of the housing 12 are mated to one another around the handlebar 30 such that the handlebar 30 is restrained within a cylindrical cavity 16. Lastly, the fasteners 14 (the heads of which are shown in FIG. 5) are tightened until the housing 12 is clamped to the handlebar 30. Thus, the tolerance for the diameter of the cylindrical cavity 16 must be carefully selected to provide a snug fit for the handlebar 30 within the cylindrical cavity 16 without detrimentally overstressing the plastic material around the cylindrical cavity.

Figure 4:
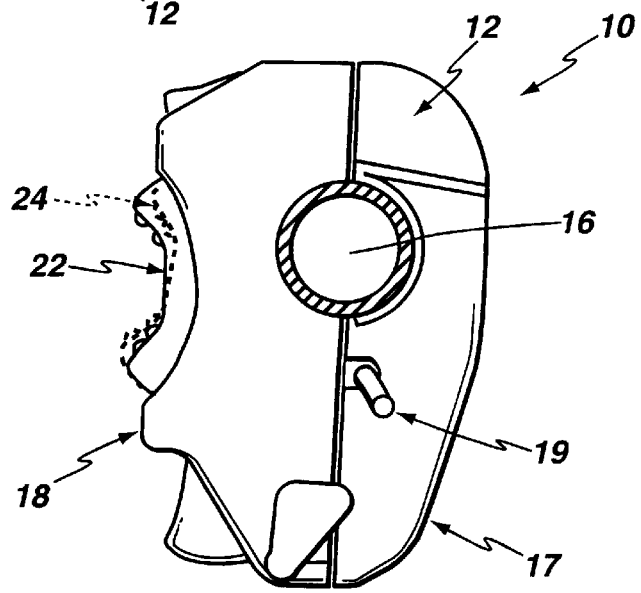
FIG. 4 is a right side elevational view of the ergonomic shifter of FIG. 1.

The shifter 10 normally has a cable 19 protruding from the housing 12 as depicted in FIGS. 2 and 4. The cable 19 typically carries a plurality of electrical wires for controlling the transmission of the vehicle. In operation, the driver either pivots the unitary shifter toggle switch 20 to the upshift position 24 or the downshift position 26. This in turn activates either an upshift switch element or a downshift switch element, respectively, thereby sending a current signal to the vehicle's electronic transmission control module to either upshift or downshift. Electronic transmission control modules and switch elements are well known in the art and are thus not shown in the drawings as they are merely peripheral to the present invention.

As shown in FIGS. 1–4, the ergonomic shifter 10 further comprises a unitary shifter toggle switch 20 movably connected to the housing 12. The unitary shifter toggle switch 20 is movable from a neutral position 22 (shown in solid lines in FIGS. 3 and 4) to an upshift position 24 (shown in dotted lines in FIG. 4) and to a downshift position 26 (shown in dotted lines in FIG. 3). The unitary shifter toggle switch is a single, integral button which is preferably mounted to the housing 12. The unitary shifter toggle switch 20 is preferably made of the same molded plastic that is used to make the housing 12 since the same requirements for environmental resistance must be satisfied. Furthermore, the unitary shifter toggle switch must not wear rapidly when in sliding contact with the housing.

Preferably, the shifter 10 further comprises a resilient member (not shown since such resilient members are well known as returning mechanisms for switches) connected to the housing 12 and connected to the unitary shifter toggle switch 20. The resilient member is capable of urging the unitary shifter toggle switch 20 from either the upshift position 24 or the downshift position 26 towards the neutral position 22.

Preferably, the unitary shifter toggle switch 20 has a plurality of small protrusions 28 as shown in FIGS. 1–4 for enhancing a driver's grip. These protrusions 28 are typically molded concurrently with the unitary shifter toggle switch itself.

The above description of preferred embodiments should not be interpreted in a limiting manner since other variations, modifications and refinements are possible within the spirit and scope of the present invention. The scope of the invention is defined in the appended claims and their equivalents.

What is claimed is:

1. An ergonomic shifter mountable to a handlebar of a motor vehicle, said shifter comprising:
   a housing mountable to said handlebar;
   a unitary shifter toggle switch movably connected to said housing, said unitary shifter toggle switch being movable from a neutral position to an upshift position and a downshift position, said unitary shifter toggle switch being connected to an upshift switch element and a downshift switch element, said elements being connected by electrical wires to an electronic transmission control module.

2. An ergonomic shifter as defined in claim 1 wherein said unitary shifter toggle switch is pivotally mounted to said housing.

3. An ergonomic shifter as defined in claim 2 wherein said housing is mountable to said handlebar adjacent a gripping portion of said handlebar.

4. An ergonomic shifter as defined in claim 3 further comprising a resilient member connected to said housing and connected to said unitary shifter toggle switch, said resilient member being capable of urging said unitary shifter toggle switch from either the upshift position or the downshift position towards the neutral position.

5. An ergonomic shifter as defined in claim 4 wherein the unitary shifter toggle switch has a plurality of small protrusions for enhancing a driver's grip.

6. An ergonomic shifter as defined in claim 1 wherein said housing is mountable to said handlebar adjacent a gripping portion of said handlebar.

7. A motor vehicle having:
a handlebar;
an ergonomic shifter, said shifter comprising:
   a housing mountable to said handlebar;
   a unitary shifter toggle switch movably connected to said housing, said unitary shifter toggle switch being movable from a neutral position to an upshift position and a downshift position, said unitary shifter toggle switch being connected to an upshift switch element and a downshift switch element, said elements being connected by electrical wires to an electronic transmission control module.

8. A motor vehicle as defined in claim 7 wherein said unitary shifter toggle switch is pivotally mounted to said housing.

9. A motor vehicle as defined in claim 7 wherein said housing is mountable to said handlebar adjacent a gripping portion of said handlebar.

10. A motor vehicle as defined in claim 7 wherein said housing is mountable to said handlebar adjacent a gripping portion of said handlebar.

11. A motor vehicle as defined in claim 7 further comprising a resilient member connected to said housing and connected to said unitary shifter toggle switch, said resilient member being capable of urging said unitary shifter toggle switch from either the upshift position or the downshift position towards the neutral position.

12. A motor vehicle as defined in claim 7 wherein the unitary shifter toggle switch has a plurality of small protrusions for enhancing a driver's grip.

* * * * *